United States Patent [19]

Hermkens

[11] Patent Number: 4,744,253
[45] Date of Patent: May 17, 1988

[54] SYSTEM FOR DETERMINING THE PRESSURE IN THE NIP BETWEEN TWO ROLLERS

[75] Inventor: Gerardus A. J. Hermkens, Ew Herten, Netherlands

[73] Assignee: Oce-Nederland B.V., Venlo, Netherlands

[21] Appl. No.: 905,970

[22] Filed: Sep. 11, 1986

[30] Foreign Application Priority Data

Sep. 11, 1985 [NL] Netherlands .................. 8502475

[51] Int. Cl.$^4$ .................... G01L 5/00; H01L 27/20
[52] U.S. Cl. .................... 73/862.55; 310/338; 310/800
[58] Field of Search .......... 73/862.55, 862.04, 862.68, 73/641, DIG. 4; 310/338, 800

[56] References Cited

U.S. PATENT DOCUMENTS

| | | | |
|---|---|---|---|
| 4,016,756 | 4/1977 | Kunkle .................. | 73/862.55 X |
| 4,183,010 | 1/1980 | Miller .................. | 310/800 X |
| 4,356,423 | 10/1982 | Gudzin .................. | 310/338 |
| 4,555,953 | 12/1985 | Dario et al. .......... | 73/862.04 |
| 4,633,122 | 12/1986 | Radice .................. | 310/800 X |

FOREIGN PATENT DOCUMENTS 15534  1/1985  Japan .................. 73/862.55

Primary Examiner—Charles A. Ruehl
Attorney, Agent, or Firm—Reed Smith Shaw & McClay

[57] ABSTRACT

A system is provided for determining the pressure exerted on an object passed between two rollers. The system comprises a sensor of pressure-sensitive material and a transmission/receiving device for generating an ultrasonic wave in the sensor and then detecting the reflected pulse received by the sensor. The time difference between the transmission pulse and the pulse received by the sensor is related to the pressure exerted on the object in the nip. Preferably, the sensor consists of a laminated film comprising in sequence: a first layer of electrically conducting material; a layer of polyvinylidene fluoride; a second layer of electrically conducting material having detector regions; a layer of dielectric material; and a third layer of electrically conducting material.

10 Claims, 2 Drawing Sheets

SYSTEM FOR DETERMINING THE PRESSURE IN THE NIP BETWEEN TWO ROLLERS

FIELD OF THE INVENTION

The present invention relates to a system for determining the pressure exerted on an object passed between two rollers, at least one of which is provided with a relatively hard core having a resilient cladding. The invention further relates to a sensor used in the previously mentioned system and to a method for manufacturing the sensor.

BACKGROUND OF THE INVENTION

Devices in which paper, films or other relatively thin sheet-like materials are conveyed, such as printing presses, copying machines and the like, frequently use combinations of rollers pressed against each other between which the paper, film or the like are passed. In general, at least one of the rollers is provided with a resilient outer layer of material such as, for example, rubber.

In the conveyance of paper by means of such roller combinations, it is important to have a uniform constant pressure distribution in the nip between the rollers parallel to the center lines of the rollers. If the pressure near the shaft ends is, for example, higher than the pressure at the center, then the resilient outer layer of material will be compressed more at the ends than at the center. This results in a local increase in the speed of the resilient material and consequently a local increase in the speed with which the paper is conveyed between the rollers. This may cause the paper to be folded, creased or even start to tear. Further, if the paper is introduced asymmetrically between the rollers, then the nonuniform pressure distribution will result in the paper running askew, which, in most cases, is very undesirable.

Others have attempted to design devices for measuring the pressure between the rolls in a nip. Such devices are shown in U.S. Pat. Nos. 3,418,850 and 4,016,756 and in several foreign patent applications: European Patent Application No. 91,089; German Patent Application No. 26,53,556 and French Patent Application No. 2,351,722. Typically, these devices utilize piezoelectric effects such as described in U.S. Pat. No. 4,499,394; Japanese Patent Abstract No. 59-94028, Vol. 8, No. 211 (Sept. 26, 1984) and an article entitled "Piezo polymer promises low-cost robotic sensors" in Electronic Design, Vol. 31, No. 11 (May 1983).

None of these devices, however, provides a system by which the pressure which is exerted on the paper, film or the like during conveyance through a roller combination can be determined locally to optimize the adjustment of the rollers and thereby avoid the undesirable consequences mentioned above.

SUMMARY OF THE INVENTION

Generally, the present invention provides a system for determining the pressure exerted on an object passed between two rollers, at least one of which is provided with a relatively hard core having a resilient cladding, comprising: (a) a pressure-sensitive sensor consisting of a laminated film comprising in sequence: a first layer of electrically conducting material, a layer of polyvinylidene fluoride, a second layer of electrically conducting material having one or more detector regions which make no electrical contact with the part of the second layer situated around them, a layer of dielectric material and a third layer of electrically conducting material; (b) a transmission/receiving device, for generating an ultrasonic wave in the sensor, provided with a means for presenting a transmission pulse to the detector regions of the sensor via one or more lines connected to the respective detector regions while the first and third electrically conducting layers and the surrounding part of the second layer are grounded; (c) a means for detecting a receiving pulse occurring in the sensor due to the ultrasonic wave reflected against the roller core; and (d) a means for determining the time interval between the transmission pulse and the receiving pulse to determine therefrom the instantaneous thickness of the resilient cladding and, on the basis thereof, the pressure which is exerted on the object.

As will be further discussed in more detail, the layer of polyvinylidene fluoride has piezoelectric properties. By means of the transmission device, an electrical pulse is presented to selected detector regions. Because of the piezoelectric properties of the polyvinylidene fluoride layer, a vibration is generated in the layer resulting in the emission of an ultrasonic energy pulse. This pulse is coupled into the resilient cladding of the roller on the side of the first layer of electrically conducting material. After propagation through the cladding, the pulse is reflected against the relatively hard roller core, passes back through the cladding and reaches the sensor, where an electric field is generated in the polyvinylidene fluoride layer which can be detected by the receiving device. From the time difference between the transmission pulse and the receiving pulse, a conclusion can be drawn regarding the local thickness of the resilient cladding and, consequently, regarding the extent of compression of the cladding, which is related to the pressure which is exerted on the sensor.

A fundamentally important component of the system according to the present invention is the sensor. The invention is, therefore, directed not only to the system as a whole but also to the sensor which can be used in the system. According to the present invention, the sensor is made from pressure-sensitive material consisting of a laminated film. The thickness of the laminated film corresponds at least approximately to the thickness of the objects to be conveyed between the rollers. The length of the laminated film is maximally equal to the length of the nip between the rollers to be examined. The width of the laminated film is sufficient for it to be possible to realize the lines to the transmission/receiving device.

Generally, the film comprises, in sequence: a first layer of electrically conducting material; a layer of polyvinylidene fluoride; a second layer of electrically conducting material having one or more detector regions which make no electrical contact with the part of the second layer situated around them and wherein at least one detector region, and preferably all, consists of an elongated region which is in line at a predetermined mutual distance to the elongated region of another detector region, a conductor region which runs approximately essentially perpendicular to the elongated region and which is connected to a connection region; a layer of dielectrically conducting material; and a third layer of electrically conducting material.

The present invention further relates to methods for manufacturing the laminated film which can be used to form the sensor of the system according to the present invention.

Other advantages of the invention will become apparent from the detailed description and the accompanying drawings of the presently preferred embodiment of the best mode of carrying out the invention.

DESCRIPTION OF THE PREFERRED EMBODIMENT

Before preferred embodiments of the system according to the present invention are discussed, the sensor which is used in the system will be described in detail.

Figure 1:
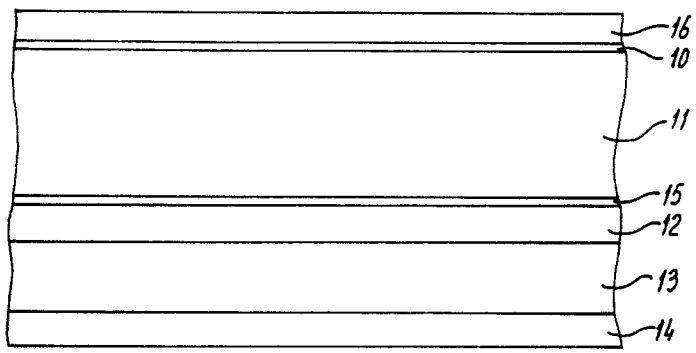
FIG. 1 represents a partial section through the film material from which the sensor according to the present invention is constructed.

FIG. 1 shows a section through a part of a laminated film. As shown in FIG. 1, the film is constructed of a first layer 10 of electrically conducting material that is situated on a layer 11 of polyvinylidene fluoride. Layer 11 is attached via an adhesive layer 15 to a second layer 12 of electrically conducting material. Layer 12 is situated on a layer 13 of dielectric material which in turn is covered by a third layer 14 of electrically conducting material. Finally, a layer 16 of flexible material such as silicone rubber is disposed at the top of the laminated film.

Figure 2:
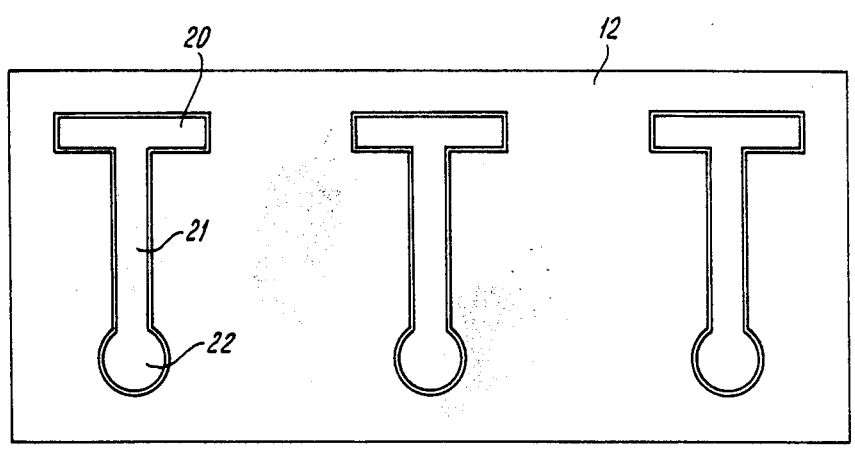
FIG. 2 represents a plane view of the second layer of electrically conducting material in which detector regions are provided.

FIG. 2 shows a plan view of second layer 12 of electrically conducting material. This layer is provided with a number of detector regions which each consist of an elongated region 20 and a conductor region 21 adjoining approximately perpendicular to elongated region 20. Conductor region 21 is connected at its other end to a connection region 22. Each of these essentially T-shaped detector regions is separated by a small gap from the remaining part of layer 12. All the elongated regions 20 lie in a line on a strip of layer 12, which strip is gripped between the rollers during the use of the film.

The operation of the sensor is based on the properties of polyvinylidene fluoride layer 11. Polyvinylidene fluoride, abbreviated in the literature to PVDF or $PVF_2$, a semi-crystalline polymer. The material is readily manufactured in the forms of a film and has, in addition to crystalline properties, also amorphous properties such as flexibility and unbreakability. The film consists of carbon (C) chains with hydrogen (H) and fluoride (F) branches. The H and F atoms provide a dipole moment. These dipoles can be aligned at elevated temperature (approximately 70° C.) by stretching the film and applying an electric field. If the dipoles are aligned and subsequently "frozen in," then the film exhibits piezoelectric properties. The internal dipoles are compensated for at the surface of the film.

If the film is now compressed as a result of an external pressure in the thickness direction, then the internal dipoles will become less oriented and the dipole moment will decrease because the lattice distances are compressed. The result is that the compensation charge has to be removed and this can be detected externally.

If, on the other hand, the compensation charge is disturbed by the presentation of an external electric field, this will result in a mechanical compression/expansion of the film, which provides the possibility of generating an ultrasonic pulse by means of a high frequency electric field.

In the configuration of FIGS. 1 and 2, the polyvinylidene fluoride layer 11 with the first electrically conducting layer 10 at the top and the second electrically conducting layer 12 at the bottom is, in fact, used for piezoelectric conversion. During use, layer 10 is grounded. The connection regions 22 of the detector regions 20 of layer 12 are connected to suitable measuring instruments and the remaining part of layer 12 is grounded. If a pressure is then exerted on the film causing the film to be deformed in the thickness direction locally and, in particular, at the position of the elongated regions 20 of the detector regions, then this mechanical deformation will bring about an electric charge displacement which can be detected via the measuring instruments connected to the detector regions.

If, on the other hand, a high-frequency electric field is applied across layer 11 via the detector regions, as a reaction thereto, there will be generated in layer 11 an ultrasonic wave which in principle is emitted both upwards and downwards. The ultrasonic vibration emitted towards the bottom in FIG. 1 is damped by the further layers of the film assembly. In layers 12, 13 and 14, the acoustic energy is virtually completely absorbed. If the layers 12 and 14 are manufactured from copper and if layer 13 is manufactured from capton, then only 1% of the signal generated in layer 11 is transmitted. A further consequence of this damping at the bottom of the film assembly is that the mechanical vibration in layer 11 decays very rapidly after termination of the activating electric field so that the sensor can be switched over rapidly from transmission to receiving.

Like the uppermost conducting layer 10, the lowermost, third conducting layer 14 is also grounded when the film is in use and these layers together form a Faraday cage, as a result of which an effective screening against external interfering effects is obtained.

Layer 16 at the top is manufactured from a material with a low acoustic impedance, for example silicone rubber, by which a good transmission and a good coupling of the acoustic vibration onto the resilient cladding of the roller are obtained.

Figure 3:
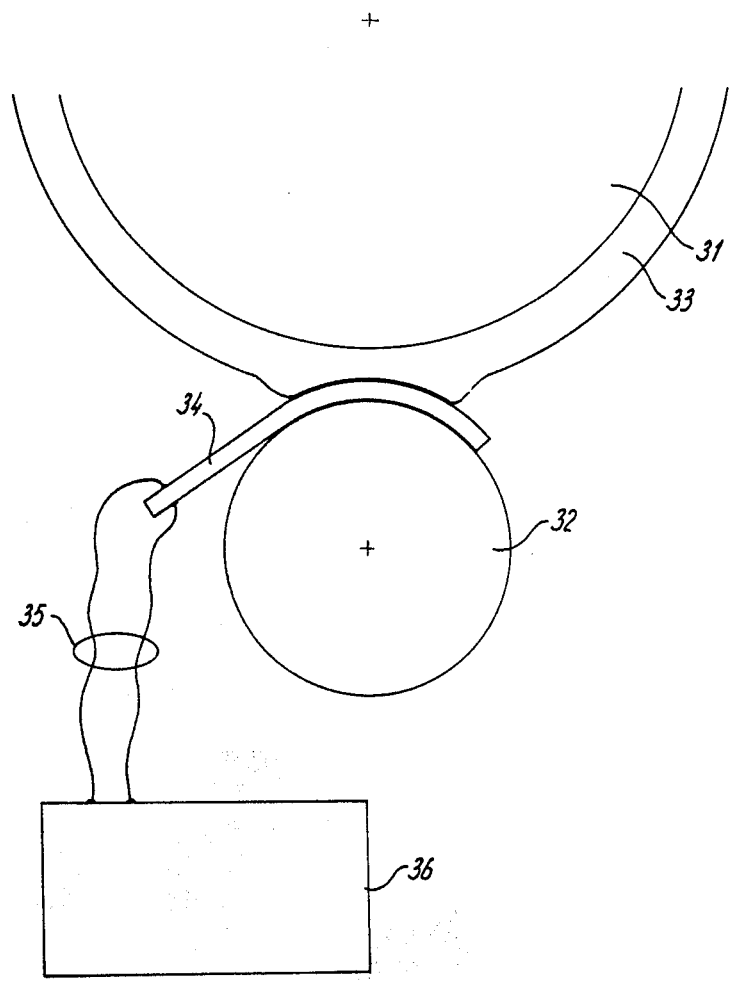
FIG. 3 shows diagrammatically a combination of rollers in which the system according to the present invention is used for determining the pressure which is exerted by the rollers on an object in the nip between two rollers.

In FIG. 3, an arrangement is shown very diagrammatically of two rollers 31 and 32 with a relatively thin sensor 34 between them. The roller 31 is provided with a hard inflexible core and an outer layer 33 of resilient material such as, for example, rubber. Roller 32 is shown as a hard roller, but the present invention can also be used for two rollers which are both provided with a resilient cladding. Sensor 34 is connected to a measuring apparatus 36 via lines 35. Lines 35 include signal lines to each of the connection regions 22 of sensor 34 and also at least one ground line.

Measuring apparatus 36 is a device known per se, for example the ultrasonic test apparatus USIP 12 made by Krautkramer. By means of the test apparatus, an electric high-frequency pulse is transmitted at a predetermined time instant $t_0$ to sensor 34, as a result of which, in the manner previously described, an ultrasonic vibration is generated by each of the detector regions in sensor 34. This vibration is emitted at the top to roller 31. As has already been discussed, the ultrasonic vibration at the bottom, in the direction of roller 32, is damped in sensor 34 itself. The emitted ultrasonic vibration passes through the resilient cladding 33, is reflected by the hard core of roller 31 and returns to sensor 34. The returning ultrasonic vibration generates an electric pulse at time instant $t_1$ in sensor 34 which is fed to measuring apparatus 36. In measuring apparatus 36, the time difference $t_1 - t_0$ is determined, which time difference is a measure of the thickness of resilient cladding 33 in the nip between rollers 31 and 32.

As is indicated diagrammatically in FIG. 3, the resilient cladding 33 is somewhat deformed by the presence of sensor 34. By means of a suitable number of detector regions in the film, it is now possible to determine over the whole width of the nip whether or not this deformation is uniform.

The sensor illustrated in FIGS. 2 and 3 may be manufactured by fabricating a first part assembly consisting of a dielectric film to which a layer of electrically conducting material is applied on both sides. This first part assembly then comprises the layers 12, 13 and 14. Copper is preferably used for layers 12 and 14, and capton is preferably used for layer 13. However, other conducting materials and other dielectric materials can also be used.

The pattern of the detector regions in the layer 12 can be manufactured by any method suitable therefor. Preferably, however, use is made of an etching process to remove the narrow strips of material between the detector regions and the remaining part of second layer 12.

A second part assembly is manufactured by providing a polyvinylidene fluoride film with an electrically conducting layer on one side. The second part assembly then comprises layers 10 and 11 of FIG. 1. Layer 10 of electrically conducting material is preferably manufactured from aluminum, but may also be manufactured from copper or another electrically conducting material. The two part assemblies are then bonded to each other by means of an adhesive layer 15 such as shown in FIG. 1. The adhesive layer consists, for example, of a solution of 5% Union Carbide 49001. This adhesive is applied at room temperature to the PVDF film by means of a so-called kiss coating. The bonding is then brought about under pressure and temperature (60° C.).

Top layer 16 consists of a material having a low acoustic damping, for example, silicone rubber. It is applied during the manufacture of the second part assembly or is applied after the two part assemblies are bonded to each other. In the case of silicone rubber, a so-called "air brush" method is preferably used to apply the silicone rubber to conducting layer 10.

While presently preferred embodiments of the invention have been shown and described in particularity, the invention may be otherwise embodied within the scope of the appended claims.

What is claimed is:

1. A system for determining the pressure which is exerted on an object passed between two rollers, at least one of which is provided with a relatively hard core having a resilient cladding, comprising: (a) a pressure-sensitive sensor consisting of a laminated film comprising in sequence: a first layer of electrically conducting material, a layer of polyvinylidene fluoride, a second layer of electrically conducting material having one or more detector regions which make no electrical contact with the part of the second layer situated around them, a layer of dielectric material and a third layer of electrically conducting material; (b) a transmission/receiving device, for generating an ultrasonic wave in the sensor, provided with a means for presenting a transmission pulse to the detector regions of the sensor via one or more lines connected to the respective detector regions while the first and third electrically conducting layers and the surrounding part of the second layer are grounded; (c) a means for detecting a receiving pulse occurring in the sensor due to the ultrasonic wave reflected against the roller core; and (d) a means for determining the time interval between the transmission pulse and the receiving pulse to determine therefrom the instantaneous thickness of the resilient cladding and the pressure which is exerted on the object.

2. A system as describe in claim 1 further comprising a layer of material having a low acoustic impedance applied to the first layer of electrically conducting material.

3. A system as described in claim 2 wherein the layer of material having a low acoustic impedance consists of silicone rubber.

4. A system as described in claim 1 wherein a detector region comprises: an elongated region which runs parallel to the nip between the rollers; a conductor region adjoining approximately perpendicular to the elongated region; and a connection region connected to the other end of the conductor region and to the transmission/receiving device.

5. A system as described in claim 4 wherein the sensor is provided with a plurality of detector regions in a predetermined pattern such that the elongated regions of all the detector regions are in one line.

6. A laminated film sensor for determining pressure comprising in sequence: a first layer of electrically conducting material; a layer of polyvinylidene fluoride; a second layer of electrically conducting material having a plurality of detector regions which make no electrical contact with the part of the second layer situated around them; a layer of dielectric material; and a third layer of electrically conducting material, wherein a detector region further comprises: an elongated region which is in line at a predetermined mutual distance with an elongated region of another detector region; and a conductor region adjoining approximately perpendicular to the elongated region; and a connection region connected to the other end of the conductor and to a transmission/receiving device.

7. A sensor as described in claim 6 further comprising a layer of a material having a low acoustic impedance applied to the first layer of electrically conducting material.

8. A sensor as described in claim 7 wherein the first and second electrically conducting layers are comprised of copper.

9. A sensor as described in claim 8 wherein the electrically conducting third layer is comprised of aluminum.

10. A sensor as described in claim 8 wherein the dielectric film is comprised of capton.

* * * * *